United States Patent [19]
Chiba et al.

[11] Patent Number: 6,118,393
[45] Date of Patent: Sep. 12, 2000

[54] EFM SIGNAL FRAME PERIOD DETECTING CIRCUIT, AND SYSTEM FOR CONTROLLING THE FREQUENCY OF THE BIT SYNCHRONIZING CLOCK SIGNAL USED FOR REPRODUCING THE EFM SIGNAL

[75] Inventors: Toshinari Chiba; Hiromichi Nogawa, both of Yamagata, Japan

[73] Assignee: NEC Corporation, Tokyo, Japan

[21] Appl. No.: 09/100,963

[22] Filed: Jun. 22, 1998

[30] Foreign Application Priority Data

Jun. 20, 1997 [JP] Japan ..................................... 9-164203

[51] Int. Cl.[7] .............................. H03M 7/00; H04L 7/00; G11B 15/52
[52] U.S. Cl. ................................................ 341/61; 369/47
[58] Field of Search .......................... 341/61; 369/44.26, 369/47, 48, 49, 59; 348/524; 368/201; 327/156; 375/237

[56] References Cited

U.S. PATENT DOCUMENTS

| | | | |
|---|---|---|---|
| 4,472,686 | 9/1984 | Nishimura et al. ........................ | 341/53 |
| 4,532,561 | 7/1985 | Kimura et al. . | |
| 4,901,300 | 2/1990 | Van Der Zande et al. ................ | 369/47 |
| 5,187,699 | 2/1993 | Raaymakers et al. ..................... | 369/48 |

FOREIGN PATENT DOCUMENTS

| | | |
|---|---|---|
| 58-56258 | 4/1983 | Japan . |
| 9-284127 | 10/1997 | Japan . |

*Primary Examiner*—Patrick Wamsley
*Attorney, Agent, or Firm*—Foley & Lardner

[57] ABSTRACT

A system for controlling the frequency of a bit synchronizing clock signal used for reproducing an EFM signal, comprises an EFM signal frame period detecting circuit for frequency-dividing an EFM signal by 117 to output a $1/117$ frequency-divided signal as a frame period signal. A control unit counts the level transition interval of the EFM signal by the bit synchronizing clock signal, selects a maximum count value in a detecting duration defined by each frame period signal, and compares the maximum count value with a predetermined value corresponding to the bit length of a frame synchronizing signal included in the EFM signal. When the maximum count value is larger than the predetermined value, the control unit controls to decrease the oscillation frequency of a bit synchronizing clock signal generating circuit, and when the maximum count value is larger than the predetermined value, the control unit controls to increase the oscillation frequency of a bit synchronizing clock signal generating circuit, with the result that the frequency of the bit synchronizing clock signal is controlled to maintain the counted pulse width of the frame synchronizing signal equal to the length of 11 bit synchronizing clock signals.

12 Claims, 4 Drawing Sheets

EFM SIGNAL FRAME PERIOD DETECTING CIRCUIT, AND SYSTEM FOR CONTROLLING THE FREQUENCY OF THE BIT SYNCHRONIZING CLOCK SIGNAL USED FOR REPRODUCING THE EFM SIGNAL

BACKGROUND OF THE INVENTION

1. Field of the Invention

The present invention relates to a circuit for obtaining a bit synchronizing clock signal used for reproducing an EFM (eight to fourteen modulation) signal. More specifically, the present invention relates to an EFM signal frame period detecting circuit and a system for controlling the frequency of the bit synchronizing clock signal used for reproducing the EFM signal.

2. Description of Related Art

The EFM signal is prescribed in an international standard such as IEC908 and in a Japanese domestic standard such as JIS 8605 (1993), as a standard signal modulation system for recording a digital signal on a compact disk. In the EFM system, a source data is divided into units of 8 bits, and each unit of 8 bits is called a "symbol". The one symbol (composed of 8 bits) is converted into a signal composed of 14 bits, as shown in FIG. 1. At this time, each of 14 bits of the symbol is called a "channel bit". The signal composed of 14 channel bits is constructed in such a manner that a minimum interval between two adjacent bit inversions is 3 bits, and a maximum interval between two adjacent bit inversions is 11 bits. In addition, as shown in FIG. 1, one frame is constituted of 588 channel bits, and a frame synchronizing signal is inserted into each one frame. The frame synchronizing signal is constituted of a pulse signal having a high level duration of a 11-bit width and a low level duration of a 11-bit width adjacent to each other. At the time of reproducing the EFM signal, this frame synchronizing signal is detected for the purpose of controlling a producing velocity.

In the prior art, at the time of reproducing the EFM signal recorded in a compact disk or another in the form modulated in the EFM system, the frequency of the bit synchronizing clock signal used for reproducing the EFM signal is controlled as proposed by Japanese Patent Application Pre-examination Publication No. JP-A-58-056258 and its corresponding U.S. Pat. No. 4,532,561 claiming Convention Priorities based on four Japanese patent applications including the Japanese Patent Application No. Showa 56-153707 published as JP-A-58-056258 (the content of U.S. Pat. No. 4,532,561 is incorporated by reference in its entirety into this application). Namely, in order to detect the frame synchronizing signal defined to have a maximum pulse width of various components included in the EFM signal, a duration for detecting the frame synchronizing signal is set to a duration corresponding to four times a predetermined frame period, and a maximum pulse width is detected in each detecting duration. Then, a frame period is predicted from the detected maximum pulse width, and a rotating speed of the disk is controlled to put the predicted value within a predetermined range, so as to maintain a linear velocity of the signal at a constant value (this is generally called a "constant linear velocity (CLV) system"). Thus, the EFM signal is reproduced.

As mentioned above, when the EFM signal is reproduced in the prior art, the reproducing velocity is maintained at a predetermined velocity. For this purpose, however, since the duration for detecting the frame synchronizing signal is set to several times the predetermined frame period, a long time is required until the EFM signal is reproduced.

SUMMARY OF THE INVENTION

Accordingly, it is an object of the present invention to provide a circuit for obtaining a bit synchronizing clock signal used for reproducing an EFM signal, which have overcome the above mentioned defect of the conventional one.

Another object of the present invention is to provide an EFM signal frame period detecting circuit capable of detecting the EFM signal frame period during a duration shorter than that required in the prior art.

Still another of the present invention is to provide a system for controlling the frequency of the bit synchronizing clock signal for reproducing the EFM signal at any reproducing velocity.

The above and other objects of the present invention are achieved in accordance with the present invention by an EFM signal frame period detecting means comprising a frequency-dividing means receiving an EFM signal for outputting a frequency-divided signal as a frame period signal having a period representative of a frame period of the received EFM signal. In a preferred embodiment, the frequency-dividing means is a 1/117 frequency divider.

According to another aspect of the present invention, there is provided a system for controlling the frequency of the bit synchronizing clock signal used for reproducing the EFM signal, comprising an EFM signal frame period detecting means including a frequency-dividing means receiving an EFM signal for outputting a frequency-divided signal as a frame period signal having a period representative of a frame period of the received EFM signal, a bit synchronizing clock signal generating means for generating a bit synchronizing clock signal, and a control means receiving the EFM signal, the frame period signal, and the bit synchronizing clock signal for counting a pulse width of a frame synchronizing signal included in the EFM signal, by using the bit synchronizing clock signal, in each frame period defined by the frame period signal, and for controlling the bit synchronizing clock signal generating means to adjust the frequency of the bit synchronizing clock signal so as to make the counted pulse width of the frame synchronizing signal equal to a length corresponding to a predetermined number of bit synchronizing clock signals.

In one embodiment, the control means includes a pulse width counting means receiving the EFM signal and the bit synchronizing clock signal for counting the width of a low level period and the width of a high level period of the EFM signal by the bit synchronizing clock signal, an in-frame maximum count value hold means receiving the frame period signal and the count value outputted from pulse width counting means, for selecting and holding a maximum count value of the count values obtained during each one detecting duration corresponding to one frame period represented by the frame period signal, a compare means for comparing the maximum count value held in the in-frame maximum count value hold means, with a predetermined value, for generating a comparison result signal, and a control means receiving the comparison result signal for outputting a frequency control signal to the bit synchronizing clock signal generating means, the frequency up-down control signal instructing the bit synchronizing clock signal generating means to decrease the frequency of the bit synchronizing clock signal when the maximum count value is larger than the predetermined value, and the frequency up-down control signal instructing the bit synchronizing clock signal generating means to increase the frequency of the bit synchronizing clock signal when the maximum count value is smaller than the predetermined value.

In another embodiment, the control means includes a pulse width counting means receiving the EFM signal and the bit synchronizing clock signal for counting the width of a low level period and the width of a high level period of the EFM signal by the bit synchronizing clock signal, an in-frame maximum count value hold means receiving the frame period signal and the count value outputted from pulse width counting means, for selecting and holding a maximum count value of the count values obtained during each one detecting duration corresponding to one frame period represented by the frame period signal, an in-N-frames minimum value hold means receiving the frame period signal and the maximum count value outputted from the in-frame maximum count value hold means every frame, for selecting and holding a minimum count value of the maximum count values outputted for each one sampling duration corresponding to N times the frame period represented by the frame period signal, a compare means for comparing the minimum count value held in the in-N-frames minimum count value hold means, with a predetermined value, for generating a comparison result signal, and a control means receiving the comparison result signal for outputting a frequency up-down control signal to the bit synchronizing clock signal generating means, the frequency up-down control signal instructing the bit synchronizing clock signal generating means to decrease the frequency of the bit synchronizing clock signal when the minimum count value is larger than the predetermined value, and the frequency up-down control signal instructing the bit synchronizing clock signal generating means to increase the frequency of the bit synchronizing clock signal when the minimum count value is smaller than the predetermined value.

The above and other objects, features and advantages of the present invention will be apparent from the following description of preferred embodiments of the invention with reference to the accompanying drawings.

DESCRIPTION OF THE PREFERRED EMBODIMENTS

Now, embodiments of the system in accordance with the present invention for controlling the frequency of the bit synchronizing clock signal used for reproducing the EFM signal, will be described with reference to the accompanying drawings.

Figure 1:
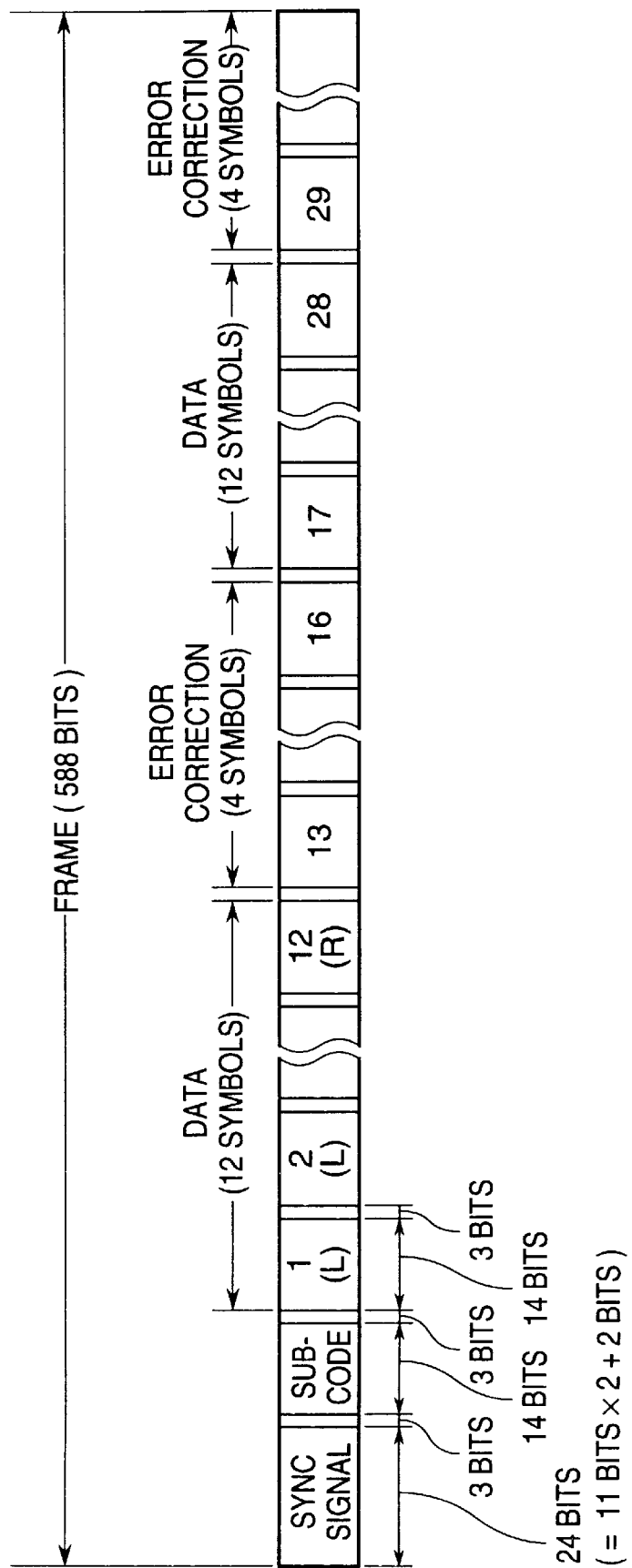
FIG. 1 illustrates the construction of the EFM signal.
Figure 2:
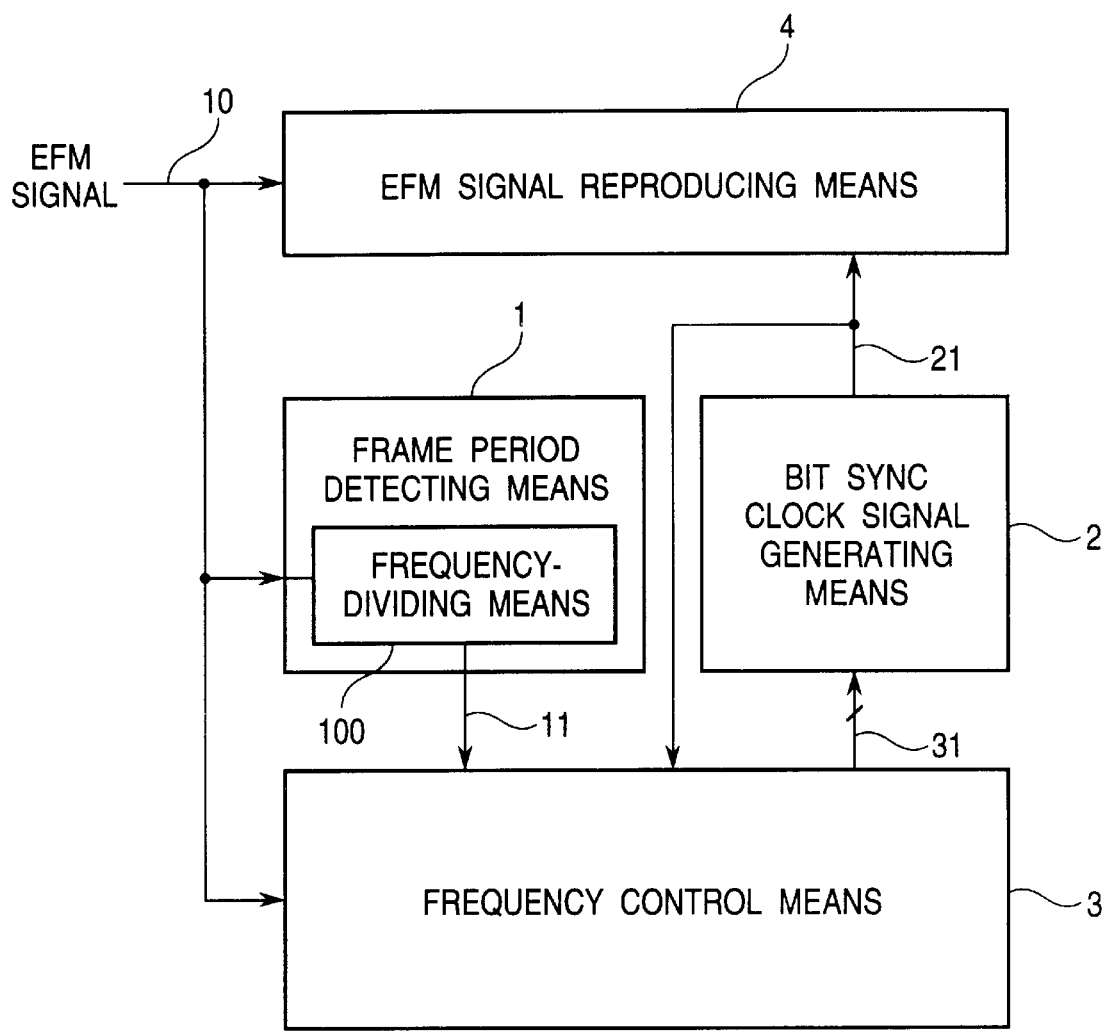
FIG. 2 is a block diagram of a first embodiment of the system in accordance with the present invention for controlling the frequency of the bit synchronizing clock signal used for reproducing the EFM signal.

Referring to FIG. 2, a first embodiment of the system in accordance with the present invention for controlling the frequency of the bit synchronizing clock signal used for reproducing the EFM signal, includes an EFM signal frame period detecting means 1 receiving an EFM signal 10 for generating a frame period signal 11, a bit synchronizing clock signal generating means 2 for generating a bit synchronizing clock signal 21, a frequency control means 3 receiving the EFM signal 21, the frame period signal 11 outputted from the EFM signal frame period detecting means 1, and the bit synchronizing clock signal 21 generated in the bit synchronizing clock signal generating means 2, for outputting a frequency up-down control signal 31 to the bit synchronizing clock signal generating means 2, and an EFM signal reproducing means 4 receiving the EFM signal 21 and the bit synchronizing clock signal 21 for generating a reproduced and error-corrected digital signal. The EFM signal frame period detecting means 1 is constituted of for example a frequency-dividing means 100 receiving the EFM signal 1 for frequency-dividing the EFM signal 10 by 117 to output a $1/117$ frequency-divided signal as the frame period signal 11. Here, the period of this $1/117$ frequency-divided signal is considered to be representative of one frame period of the received EFM signal 10.

Here, the reason of frequency-dividing the input EFM signal 10 by 117, is that if an averaged signal inversion interval per one frame in the EFM signal is sought, it was found that it is about the length of about 5 bits, and therefore, if 117 signal inversions are counted, a signal corresponding to the period of one frame can be obtained.

Figure 3:
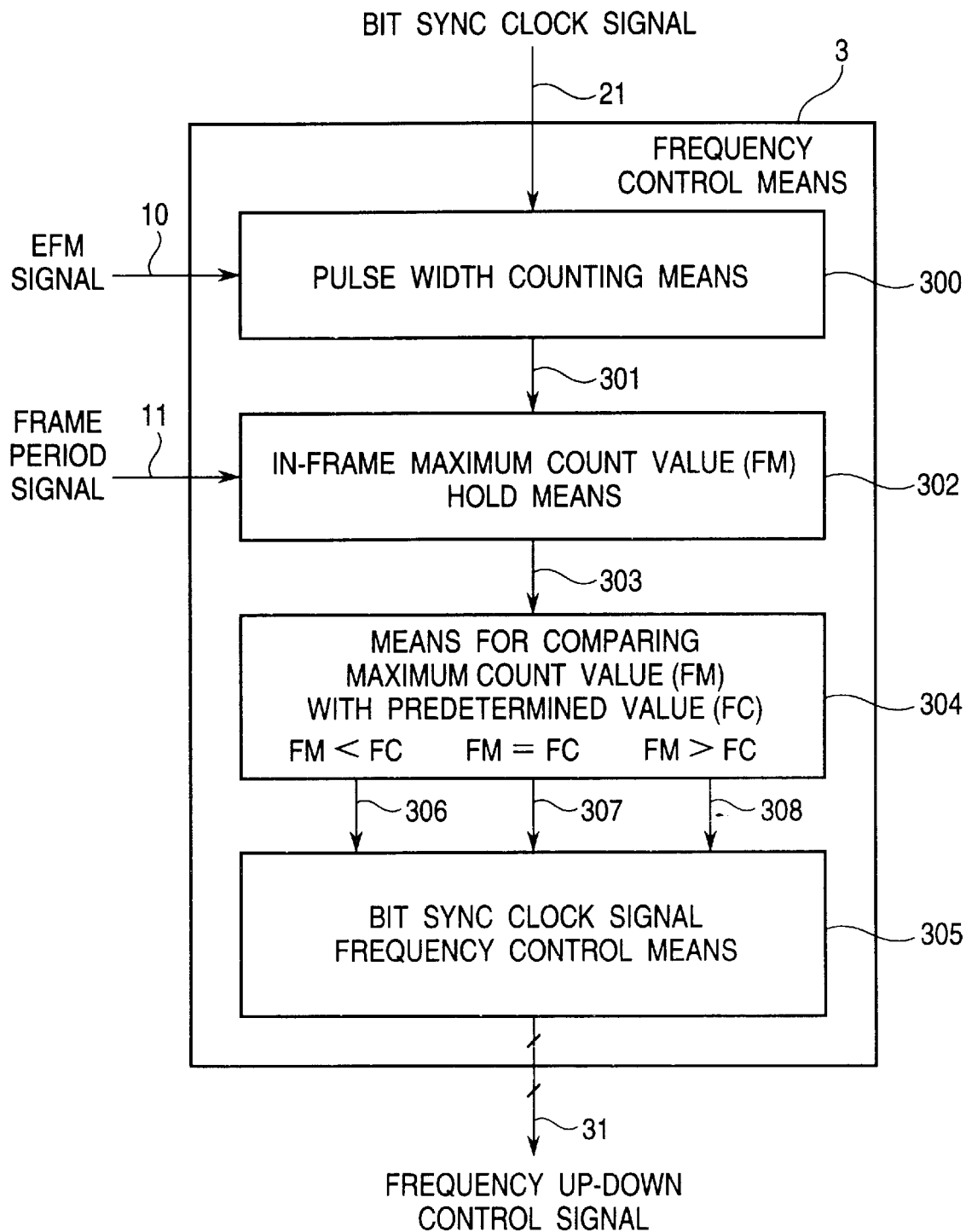
FIG. 3 is a block diagram of the frequency control means incorporated in the first embodiment of the system in accordance with the present invention for controlling the frequency of the bit synchronizing clock signal used for reproducing the EFM signal.

Referring to FIG. 3, there shown a block diagram of the frequency control means 3 incorporated in the first embodiment of the system in accordance with the present invention for controlling the frequency of the bit synchronizing clock signal used for reproducing the EFM signal.

The frequency control means 3 includes a pulse width counting means 300 receiving the EFM signal 10 and the bit synchronizing clock signal 21 for counting the width of a low level period and the width of a high level period of the EFM signal 10 by the bit synchronizing clock signal 21, and outputting a count value 301 at each time the signal level inversion occurs in the EFM signal 10. An in-frame maximum count value hold means 302 received the frame period signal 11 and the count value 301 outputted from the pulse width counting means 300, for selecting, holding and outputting a maximum count value 303 of the count values obtained outputted from pulse width counting means 300 during each one detecting duration corresponding to one frame period represented by the frame period signal 11. Because, it is prescribed in the EFM signal that a signal having a maximum pulse width is a frame synchronizing signal. Therefore, the maximum count value (FM) held in the in-frame maximum count value hold means 302 corresponds to the pulse width of the frame synchronizing signal.

A compare means 304 compares the maximum count value (FM) 303 held in the in-frame maximum count value hold means 302, with a predetermined value (FC) which is a count value making the pulse width of the frame synchronizing signal equal to a 11-bit length. When the maximum count value (FM) is smaller than the predetermined value (FC), the compare means 304 activates an output line 306. When the maximum count value (FM) is equal to the predetermined value (FC), the compare means 304 activates an output line 307. When the maximum count value (FM) is larger than the predetermined value (FC), the compare means 304 activates an output line 308.

A control means 305 receives the three output lines 306, 307 and 308 and outputs the frequency up-down control signal 31 to the bit synchronizing clock signal generating means 2. When the maximum count value (FM) is larger than the predetermined value (FC), the control means 305 controls, through the frequency up-down control signal 31, the bit synchronizing clock signal generating means 2 to decrease the oscillation frequency of the bit synchronizing clock signal generating means 2 so as to lower the frequency of the bit synchronizing clock signal 21. To the contrary, when the maximum count value (FM) is smaller than the predetermined value (FC), the control means 305 controls, through the frequency up-down control signal 31, the bit synchronizing clock signal generating means 2 to increase the oscillation frequency of the bit synchronizing clock signal generating means 2 so as to elevate the frequency of the bit synchronizing clock signal 21. When the maximum count value (FM) is equal to the predetermined value (FC), the control means 305 controls, through the frequency up-down control signal 31, the bit synchronizing clock signal generating means 2 to maintain the oscillation frequency of the bit synchronizing clock signal generating means 2 so as to keep the frequency of the bit synchronizing clock signal 21 with no modification.

The frequency of the bit synchronizing clock signal 21 generated in the bit synchronizing clock signal generating means 2 is controlled in the above mentioned manner, so that the EFM signal can be properly reproduced in the EFM signal reproducing means 4 with the bit synchronizing clock signal 21 having the frequency optimum at that time, namely, the frequency making the bit length of the frame synchronizing signal equal to the 11-bit length.

Namely, the frame period signal 11 is obtained by frequency-dividing the EFM signal by 117. If the period of this frame period signal 11 is used as the detecting duration, the frame synchronizing signal is necessarily included in each detecting duration. Therefore, the pulse width is counted by using the bit synchronizing clock signal 21 as a counting clock. When the count value corresponding to the maximum pulse width is larger than the predetermined value (a proper count value corresponding to the pulse width of the frame synchronizing signal), the oscillation frequency of the bit synchronizing clock signal generating means 2 is controlled to decrease. If the count value corresponding to the maximum pulse width is smaller than the predetermined value, the oscillation frequency of the bit synchronizing clock signal generating means 2 is controlled to increase. In this manner, the frequency of the bit synchronizing clock signal is controlled to make the count value of the maximum pulse width included in the EFM signal equal to the predetermined value. As a result, the pulse width of the frame synchronizing signal included in the EFM signal and having the maximum pulse width can be properly detected, so that the frequency of the bit synchronizing clock signal 21 used for reproducing the EFM signal can be controlled to an optimum frequency for reproducing the EFM signal. Therefore, the EFM signal can be reproduced at an arbitrary reproducing velocity.

Figure 4:
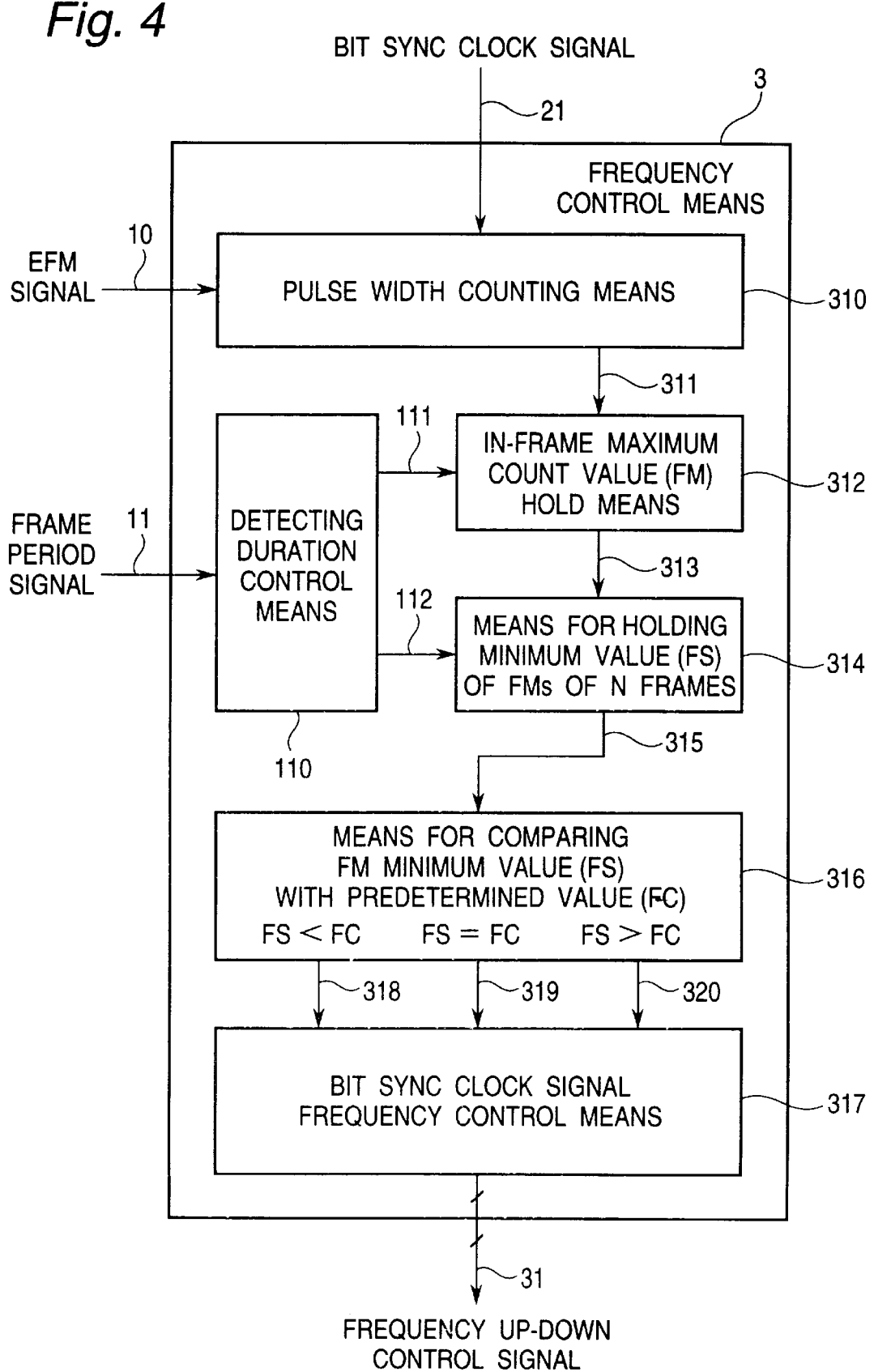
FIG. 4 is a block diagram of the frequency control means incorporated in a second embodiment of the system in accordance with the present invention for controlling the frequency of the bit synchronizing clock signal used for reproducing the EFM signal.

Referring to FIG. 4, there is shown a block diagram of the frequency control means incorporated in a second embodiment of the system in accordance with the present invention for controlling the frequency of the bit synchronizing clock signal used for reproducing the EFM signal.

In this second embodiment, the whole construction is similar to that of the first embodiment shown in FIG. 2, but has the control mean 3 different from that of the first embodiment. The control means 3 of the second embodiment includes a pulse width counting means 310 receiving the EFM signal 10 and the bit synchronizing clock signal 21, for counting the width of a low level period and the width of a high level period of the EFM signal by the bit synchronizing clock signal, to output a count value 311 at each level inversion of the received EFM signal 10, similarly to the pulse width counting means 300 of the first embodiment. The control means 3 also includes a detecting duration control means 110 receiving the frame period signal 11 for outputting the frame period signal 11 as a frame period signal 111. The detecting duration control means 110 also outputs an N-frame period signal 112 having a period corresponding to N frame period signals 11. Here, "N" is an positive integer larger than "1".

An in-frame maximum count value hold means 312 receives the frame period signal 111 and the count value 311 outputted from the pulse width counting means 310, for selecting, holding and outputting a maximum count value (FM) 313 of the count values obtained during each one detecting duration corresponding to one frame period represented by the frame period signal 111, similarly to the pulse width counting means 300 of the first embodiment. An in-N-frames minimum value hold means 314 receives the N-frame period signal 112 and the maximum count value (FM) 313, for selecting, holding and outputting a minimum count value (FS) 315 of the maximum count values (FM) obtained during each sampling duration corresponding to N frame periods and represented by the N-frame period signal 112.

A compare means 316 compares the minimum count value (FS) 315 held in the in-N-frames minimum count value hold means 314, with a predetermined value (FC) which is a count value making the pulse width of the frame synchronizing signal equal to a 11-bit length. When the minimum count value (FS) is smaller than the predetermined value (FC), the compare means 316 activates an output line 318. When the minimum count value (FS) is equal to the predetermined value (FC), the compare means 316 activates an output line 319. When the minimum count value (FS) is larger than the predetermined value (FC), the compare means 316 activates an output line 320. A control means 305 receives the three output lines 318, 319 and 320 and outputs the frequency up-down control signal 31 to the bit synchronizing clock signal generating means 2.

When the minimum count value (FS) is larger than the predetermined value (FC), the control means 317 controls, through the frequency up-down control signal 31, the bit synchronizing clock signal generating means to decrease the oscillation frequency of the bit synchronizing clock signal generating means 2 so as to lower the frequency of the bit synchronizing clock signal. To the contrary, when the minimum count value (FS) is smaller than the predetermined value (FC), the control means 317 controls, through the frequency up-down control signal 31, the bit synchronizing clock signal generating means to increase the oscillation frequency of the bit synchronizing clock signal generating means 2 so as to elevate the frequency of the bit synchronizing clock signal. When the minimum count value (FS) is equal to the predetermined value (FC), the control means 317 controls, through the frequency up-down control signal 31, the bit synchronizing clock signal generating means to maintain the oscillation frequency of the bit synchronizing clock signal generating means 2 so as to keep the frequency of the bit synchronizing clock signal with no modification.

As seen from the above, the second embodiment is different from the first embodiment in that the duration for sampling the maximum pulse width in each frame period is made to N times the frame period which is detected by the frame period detecting means 1, and the minimum pulse width is selected from among the maximum pulse widths measured during the sampling duration corresponding to N times the frame period, and then used as the measured pulse width of the frame synchronizing signal.

In this second embodiment, since the duration for detecting the maximum pulse width in each frame period is made to N times the frame period, even if there was detected a signal having the pulse width larger than that of the frame synchronizing signal because of a damaged recording pit occurring due to a scratch on a recording surface of the compact disk, it is possible to avoid the signal having the larger pulse width because of a damage, by selecting and using, as a count value of the frame synchronizing signal, the minimum count value from among the in-frame maximum count values obtained during the sampling duration of the N frame periods, with the result that a normal frame synchronizing signal can be detected. Therefore, "N" is not necessary to be a large value, and preferably is not larger than "64".

The various means included in the above mentioned embodiments are realized by various functions achieved in a digital signal processor, as well understood to persons skilled in the art, and therefore, are expressed as "means" in the above mentioned embodiments and in the drawings. However, it is a matter of course to persons skilled in the art that the various means included in the above mentioned embodiments can be realized by discrete circuits.

As seen from the above, the EFM signal frame period detecting means in accordance with the present invention is configured to detect the period corresponding to the frame period, by frequency-dividing the EFM signal by 117. Therefore, it is possible to realize the EFM signal frame period detecting means having a very simple construction.

In addition, according to the system in accordance with the present invention for controlling the frequency of the bit synchronizing clock signal for reproducing the EFM signal, it is possible to reproduce the EFM signal at any reproducing velocity.

The invention has thus been shown and described with reference to the specific embodiments. However, it should be noted that the present invention is in no way limited to the details of the illustrated structures but changes and modifications may be made within the scope of the appended claims.

What is claimed is:

1. A system for detecting an EFM signal frame period, comprising a digital signal processor receiving and frequency-dividing an EFM signal for outputting a frequency-divided signal as a frame period signal having a period representative of a frame period of the received EFM signal.

2. A system as claimed in claim 1 wherein said digital signal processor comprises a 1/117 frequency divider.

3. A system for controlling the frequency of a bit synchronizing clock signal used for reproducing an EFM signal, comprising:

an EFM signal frame period detecting means including a frequency-dividing means for receiving the EFM signal and outputting a frequency-divided signal as a frame period signal having a period representative of a frame period of the received EFM signal, a bit synchronizing clock signal generating means for generating the bit synchronizing clock signal, and a control means for receiving said EFM signal, said frame period signal, and said bit synchronizing clock signal and counting a pulse width of a frame synchronizing signal included in said EFM signal, by using said bit synchronizing clock signal, in each frame period defined by said frame period signal, and for controlling said bit synchronizing clock signal generating means to adjust the frequency of said bit synchronizing clock signal so as to make the count value equal to a value corresponding to a predetermined number of bit synchronizing clock signals.

4. A system as claimed in claim 3, wherein said control means includes a pulse width counting means for receiving said EFM signal and said bit synchronizing clock signal and counting the width of a low level period and the width of a high level period of said EFM signal by said bit synchronizing clock signal, an in-frame maximum count value hold means for receiving said frame period signal and the count value outputted from pulse width counting means, and selecting and holding a maximum count value of the count values obtained during each duration corresponding to one frame period represented by said frame period signal, a compare means for comparing the maximum count value held in said in-frame maximum count value hold means with a predetermined value and generating a comparison result signal, and a control means for receiving said comparison result signal and outputting a frequency up-down control signal to said bit synchronizing clock signal generating means, said frequency up-down control signal instructing said bit synchronizing clock signal generating means to decrease the frequency of said bit synchronizing clock signal when the maximum count value is larger than said predetermined value, and said frequency up-down control signal instructing said bit synchronizing clock signal generating means to increase the frequency of said bit synchronizing clock signal when said maximum count value is smaller than said predetermined value.

5. A system as claimed in claim 3, wherein said control means includes a pulse width counting means for receiving said EFM signal and said bit synchronizing clock signal for counting the width of a low level period and the width of a high level period of said EFM signal by said bit synchronizing clock signal, an in-frame maximum count value hold means for receiving said frame period signal and the count value outputted from pulse width counting means, and selecting and holding a maximum count value of the count values obtained during each duration corresponding to one frame period represented by said frame period signal, an in-N-frames minimum value hold means for receiving said frame period signal and the maximum count value outputted from said in-frame maximum count value hold means every frame, and selecting and holding a minimum count value of the maximum count values outputted during each sampling duration corresponding to N times the frame period represented by said frame period signal, a compare means for comparing the minimum count value held in said in-N-frames minimum count value hold means with a predetermined value and generating a comparison result signal, and a control means receiving said comparison result signal for outputting a frequency up-down control signal to said bit synchronizing clock signal generating means, said frequency up-down control signal instructing said bit synchronizing clock signal generating means to decrease the frequency of said bit synchronizing clock signal when the minimum count value is larger than said predetermined value, and said frequency up-down control signal instructing said bit synchronizing clock signal generating means to increase the frequency of said bit synchronizing clock signal when the minimum count value is smaller than said predetermined value.

6. A system as claimed in claim 5, wherein said control means further includes means for receiving said frame period signal and outputting an N-frame period signal having a period corresponding to N times the period of said frame period signal, so as to define said sampling duration.

7. A method of generating a frame period signal having a period representative of a frame period of an EFM signal, comprising the steps of:

supplying the EFM signal to a frequency divider; and frequency-dividing the EFM signal to generate the frame period signal.

8. A method as claimed in claim 7, wherein the EFM signal is frequency-divided 117 times to produce a 1/117 frequency-divided signal as the frame period signal.

9. A method for controlling the frequency of a bit synchronizing clock signal used for reproducing an EFM signal, comprising the steps of:

frequency-dividing the EFM signal and outputting a frequency-divided signal as a frame period signal having a period representative of a frame period of the EFM signal;

counting a pulse width of a frame synchronizing signal included in said EFM signal using said bit synchronizing clock signal, in each frame period defined by said frame period signal; and adjusting the frequency of said bit synchronizing clock signal so as to make the count value equal to a value corresponding to a predetermined number of bit synchronizing clock signals.

10. A method as claimed in claim 9, wherein the step of adjusting includes the steps of:

counting the width of a low level period and the width of a high level period of said EFM signal by said bit synchronizing clock signal to obtain the count value;

holding a maximum count value of the count values obtained during each duration corresponding to one frame period represented by said frame period signal;

comparing the maximum count value that is held with a predetermined value; and decreasing the frequency of said bit synchronizing clock signal when the maximum count value is larger than said predetermined value, and increasing the frequency of said bit synchronizing clock signal when said maximum count value is smaller than said predetermined value.

11. A method as claimed in claim 9, wherein said control means includes counting the width of a low level period and the width of a high level period of said EFM signal by said bit synchronizing clock signal to obtain the count value;

holding a maximum count value of the count values obtained during each duration corresponding to one frame period represented by said frame period signal;

holding a minimum count value of the maximum count values outputted during each sampling duration corresponding to N times the frame period represented by said frame period signal;

comparing the minimum count value with a predetermined value; and decreasing the frequency of said bit synchronizing clock signal when the minimum count value is larger than said predetermined value, and increasing the frequency of said bit synchronizing clock signal when the minimum count value is smaller than said predetermined value.

12. A method as claimed in claim 11, further comprising the step of outputting an N-frame period signal having a period corresponding to N times the period of said frame period signal, so as to define said sampling duration.

* * * * *